United States Patent [19]

Eberhardt

[11] Patent Number: 5,056,037
[45] Date of Patent: Oct. 8, 1991

[54] ANALOG HARDWARE FOR LEARNING NEURAL NETWORKS

[75] Inventor: Silvio P. Eberhardt, Pasadena, Calif.

[73] Assignee: The United States of America as represented by the administrator of the National Aeronautics and Space Administration, Washington, D.C.

[21] Appl. No.: 463,720

[22] Filed: Dec. 28, 1989

[51] Int. Cl.[5] .............................................. G06G 7/12
[52] U.S. Cl. .................................... 364/513; 364/807
[58] Field of Search ....................... 364/513, 807, 131; 365/117

[56] References Cited

U.S. PATENT DOCUMENTS

| | | | |
|---|---|---|---|
| 3,601,811 | 8/1971 | Yoshino | 340/172.5 |
| 4,593,367 | 6/1986 | Slack et al. | 364/513 |
| 4,660,166 | 4/1987 | Hopfield | 364/131 |
| 4,737,929 | 4/1988 | Denker | 364/807 |
| 4,773,024 | 9/1988 | Faggin et al. | 364/513 |
| 4,796,199 | 1/1989 | Hammerstrom et al. | 364/513 |
| 4,802,103 | 1/1989 | Faggin et al. | 364/513 |
| 4,805,225 | 2/1989 | Clark | 382/15 |
| 4,807,168 | 2/1989 | Moopenn et al. | 364/807 |
| 4,809,193 | 2/1989 | Jourjine | 364/513 |
| 4,873,455 | 10/1989 | de Chambost et al. | 365/117 |
| 4,874,963 | 10/1989 | Alspector | 377/2 |
| 4,901,271 | 2/1990 | Graf | 364/807 |
| 4,912,649 | 3/1990 | Wood | 364/513 |
| 4,918,618 | 4/1990 | Tomlinson, Jr. | 364/513 |
| 4,933,872 | 6/1990 | Vandenberg et al. | 364/513 |
| 4,945,494 | 7/1990 | Penz et al. | 382/15 |
| 4,951,239 | 8/1990 | Andes et al. | 364/807 |

OTHER PUBLICATIONS

"A General Purpose Digital Architecture for Neural Network Simulations", M. Duranton and N. Mauduit, First IEE International Conf. on Artificial Neural Networks, Oct. 16-18, 1989.
"Pulse Arithmetic in VLSI Neural Networks", IEEE Micro, Alan F. Murray, Dec. 14, 1989.
"Neural Computing—Theory and Practice", Philip D. Wasserman, Apr. 1989.

Primary Examiner—Allen R. MacDonald
Assistant Examiner—George Davis
Attorney, Agent, or Firm—Thomas H. Jones; Harold W. Adams; John R. Manning

[57] ABSTRACT

This is a recurrent or feedforward analog neural network processor having a multi-level neuron array and a synaptic matrix for storing weighted analog values of synaptic connection strengths which is characterized by temporarily changing one connection strength at a time to determine its effect on system output relative to the desired target. That connection strength is then adjusted based on the effect, whereby the processor is taught the correct response to training examples connection by connection.

10 Claims, 4 Drawing Sheets

ANALOG HARDWARE FOR LEARNING NEURAL NETWORKS

ORIGIN ON THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to computer architectures and, more particularly, to a neural network processor capable of fully-parallel analog implementation of both single-attractor and multiple-attractor configurations with maximum speed of operation comprising, a plurality of input neurons each having an input for receiving a voltage stimulus and an output for outputting a voltage output; a plurality of output neurons each having an input for receiving a voltage input and an output for outputting a voltage output; a synaptic array comprising a plurality of synapses connecting the output of respective ones of the input neurons to the input of respective ones of the output neurons, each of the synapses having a weighting factor associated therewith determining the conductance therethrough and means for changing the weighting factor including a weighting factor changing input; a weighting factor update conductor disposed throughout the synaptic array; a plurality of individually addressable switches connected between the weighting factor changing input of respective ones of the synapses and the weighting factor update conductor; and, learning controller means connected to the switches and the weighting factor update conductor for enabling selected ones of the switches to connect the weighting factor changing input of the associated synapse to the weighting factor update conductor and for simultaneously applying a weighting factor update voltage value to the weighting factor update conductor.

In the preferred embodiment, the learning controller means includes logic for updating each synapse in turn by enabling its switch, changing the conductance value of the synapse slightly, evaluating the effect of that slight change on an output of the synapse, and implementing a learning rule to determine a final change in that synapse's conductance.

In one exemplary implementation, the learning rule implements the change in the conductance value $\Delta w$ as:

$$\Delta w = \eta \sum_{i=0}^{M} \text{sign}_i |o_i^+ - o_i^-| |o_i^+ - t_i|$$

where $\eta$ is a previously-established learning rate, $o^+$ and $o^-$ are the $i^{th}$ output neuron results before and after the temporary synapse conductance modification, t is an $i^{th}$ target value, and "sign" is the direction in which the $i^{th}$ output changes with respect to the $i^{th}$ target.

The preferred learning controller means comprises, a plurality of learning rule processor means connected to the output of respective ones of the output neurons for determining a component of error reduction or increase due to each output neuron's variation in response to a voltage stimulus applied to the input of the input neurons and a temporary synapse conductance modification according to a learning rule implemented thereby; summing amplifier means for receiving the component of error from the plurality of learning rule processor means at input thereof and for providing a summation thereof at an output; scaling means for receiving the summation from the summing amplifier means at an input thereof and for providing the summation scaled by a pre-established learning rate factor at an output; update generator means for receiving a scaled summation from the scaling means at an input thereof and for generating a voltage signal required to change the conductance of a synapse and applying the voltage signal to the weighting factor update conductor; and, digital events sequencer means having a CLOCK input thereto for causing the sequencer means to repeatedly sequence through a plurality of learning steps, the digital events sequencer means including logic means for updating each synapse in turn by enabling its switch, changing the conductance value of the synapse slightly, evaluating the effect of that slight change on an output of the synapse, and causing the plurality of learning rule processor means to implement the learning rule to determine a final change in that the synapse's conductance.

BACKGROUND ART

Neural network systems promise a totally new approach to information processing that is inherently fault-tolerant, uniquely suited to fuzzy and ill-posed problems (e.g. image or speech recognition), and extremely fast. To realize its full potential for high-speed processing, however, a neural network must be implemented in fully parallel hardware. Furthermore, the majority of applications require that a neural network be capable of learning from example and generalizing the learned examples to new input values. This is necessary in situations where the relationship between input and output is difficult to ascertain explicitly or changes with time. This, of course, is a major point of difference between the implementation of problems on digital computers and their implementation in a neural network. The digital computer is merely an automaton which can perform a sequence of precisely defined steps (i.e. a computer program) on data. Any data which does not conform to the definition of the problem as contained in the programming produces an error state. A neural network, on the other hand, has the problem loosely defined by the logic of the synapses. The weighting factors associated with the various synapses are adjusted as part of a repetitive process wherein sets of input values are input to the network, the outputs from the network are compared to known results for the inputs, and the weighting factors adjusted until the correct answers are produced for all the inputs. In this way, the network "learns" how to solve the problem under any input conditions. Interesting descriptions of prior art techniques and apparatus of the neural network variety can be found in the very recently issued patents of Faggin et al. (U.S. Pat. No. 4,773,024 (September 1988) and U.S. Pat. No. 4,802,103 (January 1989). The teachings of the now-expired patent of Yoshino (U.S. Pat. No. 3,601,811) are also relevant to the problem as applied to fore-runners of neural networks, i.e. discrete component analog computer "learning machines".

Standard learning algorithms used for "teaching" neural networks, such as backpropagation, can be demonstrated for simple cases in simulation with ease but are extremely difficult to implement in hardware, particularly for more than trivial problems. Analog systems exhibit non-ideal circuit behaviors that are not compensated by the learning algorithms; and, digital implementations require prohibitive amounts of silicon real estate. It should be noted that many applications do not require that the learning phase of the network implementation and operation be time efficient, only the retrieval phase. Military applications would be a good example of such conditions. The time necessary to teach a neural network decision-making computer as part of the manufacturing process is unimportant as compared to the real-time operation of the network under field conditions which will take place well in the future. Another good example is speech recognition wherein a machine employing the neural network is trained from taped recordings of one or more speakers. For such cases (which represent the vast majority), the problem then is how to implement a learning neural network system in fully parallel analog hardware; that is, how best to implement the learning process without regard to the time involved in order to implement the neural network itself as fully parallel analog hardware in order to minimize the run-time time of computation.

The standard method of training a learning network is to iteratively cycle through a training set. For each training set item, the prompt (i.e. the inputs) is applied to the network inputs, a data retrieval operation is performed, and the connection weights of the synapses are modified so that the network output approaches the target (desired) vector. Weights are only slightly adjusted for each training set item as, otherwise, the system tends to "forget" information previously stored. Consequently, the learning phase of the prior art algorithms tends to require much computation. In some cases, literally millions of training iterations may be required to reduce errors to acceptable levels.

In traditional learning algorithms, the difference between the output of the network and the target for each prompt (i.e. the error) is backpropagated through a complex distributed feedback system that serves to calculate the increment by which each weight in the system is modified. It is this complicated learning circuitry which adds to the complexity of the network as mentioned earlier. In this regard, it should be mentioned that while it may be possible to perform the learning on a computer and then download the weights into the neural network hardware (and thereby eliminate the learning portion of the hardware), such an approach can only work if the learning program accurately simulates the actual hardware behavior. Again, in all but trivial cases, such a goal is virtually impossible to realize. The feedback system is difficult to implement reliably in analog hardware for two reasons. First, backpropagation circuit components non-idealities are not intrinsically compensated for by the design of the algorithm; thus, error signals are generated by component error. Second, the weights (i.e. conductance) values are required in the backpropagation as well as in the feedforward portions of the algorithm. This latter factor is significant in some weighting circuit designs in which the weight circuit must be switched from one circuit configuration to another. In other words, in addition to the circuitry of the backpropagation algorithm which must be implemented as part of the neural network, there must be switching circuitry to switch commonly used components between the feedforward portions of the network and the backpropagation portions of the circuit. As can be appreciated, such a requirement simply adds to an already overly complex circuit design as well as increasing the probability of component and operation introduced errors.

STATEMENT OF THE INVENTION

Accordingly, it is an object of this invention to provide a replacement for traditional learning algorithms in neural networks which does not require backpropagation through a complex distributed feedback system.

It is another object of this invention to provide a replacement for traditional learning algorithms in neural networks which allows the neural network to be implemented in fully parallel analog hardware.

It is still another object of this invention to provide a replacement for traditional learning algorithms in neural networks which allows the neural network to run at maximum speed at run-time at the sacrifice of learning time.

Other objects and benefits of this invention will become apparent from the detailed description which follows hereinafter when taken in conjunction with the drawing figures which accompany it.

DETAILED DESCRIPTION OF THE INVENTION

Keeping in mind the basic philosophy of sacrificing learning time of speed at run-time, the learning system approach for a neural network implemented by the present invention is to update one weight at a time by slightly changing the weight and measuring the effect that the change has on the output. The weight is then permanently updated based on that change. If the output values approach the target values, the weight is updated in the direction of the slight change. If no change is noted in the output, or if the output is at the target, the weight is left at its original value. If the output diverges from the target, the weight is updated in the opposite direction or the small change. Several different rules for updating the weight based on the output and target values are possible. While the learning efficiency of this algorithm is poorer than that of the prior art backpropagation approach, it has several profound advantages over traditional algorithms. First, it is easily amenable to a hardware implementation, as will be described hereinafter. This results from the fact that the learning circuitry is separate from the data access circuitry; indeed, the data access scheme is irrelevant as far as the learning circuitry is concerned. Second, because of the independence of the data access scheme, feedback (recurrent) neural network architectures can be implemented. Learning algorithms such as backpropagation require strictly feedforward architectures (i.e. no feed back in the data retrieval phase). They are called single-attractor systems because outputs vary more or less continuously as inputs are varied continuously. Multiple-attractor systems, on the other hand, embody stable output states, such that the output tends to remain at one of these equilibrium points until the input varies enough to push the system to another stable state. Such stable states are created by the feedback connections of recurrent networks. Multiple-attractor systems are important in applications such as pattern recognition. To have the type of implementation of the neural network itself limited by the requirements of the circuitry needed to teach the network is a case of the tail wagging the dog. The approach of this invention does not suffer from imposing such needless constraints on system design. As will be seen, it is a unique learning system that is amenable to hardware implementation; and, its architecture can be programmed to implement either feedforward or recurrent networks.

Figure 1:
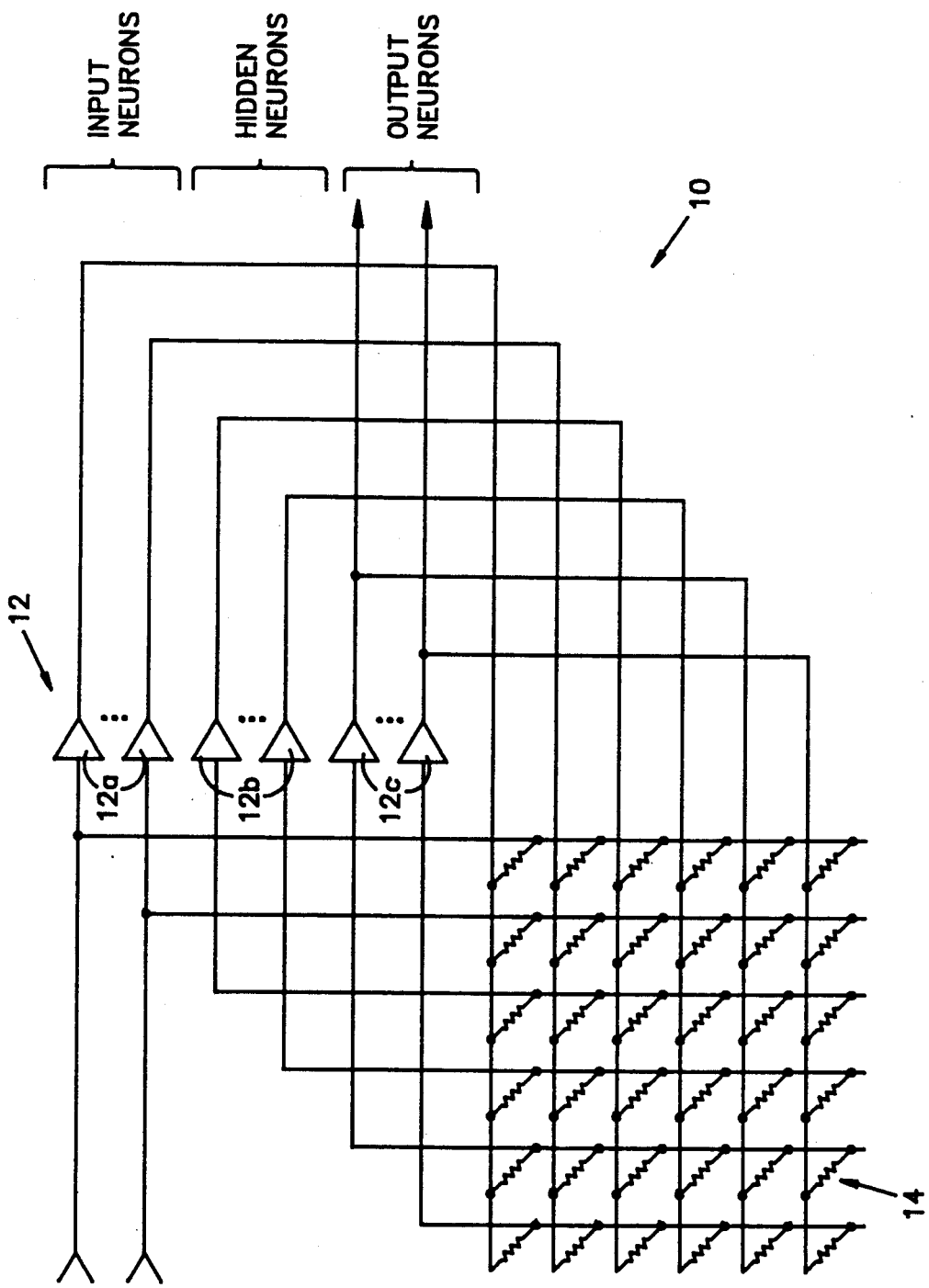
FIG. 1 is a simplified drawing of the data retrieval network portion of a neural network according to the present invention.

The hardware to implement a recurrent/feedforward learning network according to the present invention consists of two systems—a data retrieval network and a learning network. A block diagram of the data retrieval network is shown in FIG. 1 where it is generally indicated as 10. The data retrieval network 10 is a modification of a standard Hopfield neural network configuration and consists of an array of processing elements called neurons 12 that are connected together by a two-dimensional array of programmable conductance elements called synapses 14. There are three kinds of neurons 12: input neurons 12a, hidden neurons 12b, and output neurons 12c. Input neurons 12a serve to inject the prompt information into the network 10. Output neurons 12c serve to transmit results calculated by the network 10. All the other neurons 12b are called "hidden" because it is not possible to ascertain their state from an examination of the system's inputs and outputs. Note that it is possible for one neuron to be in input as well as an output neuron, and that the structure of the three neuron types may be different.

In the most general case, synapses 14 connect all output neurons 12c to all input neurons 12a via the synaptic array. In this case, an N neuron system requires $N^2$ synapses. Each synapse 14 allows the transmission of a percentage of the signal at the input of the synapse 14 to pass to the output of the synapse 14. If no information is transmitted, the synapse 14 is defined to be "off". If the synapse array is described by the conductance between input and output, where an off neuron 12 has a conductance of zero, then it can be seen that a single-attractor, feedforward network is implemented by making the synapse matrix lower triangular, with zero diagonal. In this case, no feedback is allowed in the system; all weights transmit information in a direction from input to output. This is equivalent to the feedforward configuration of the backpropagation algorithm. If the matrix is not lower-triangular, then the system has feedback elements that can generate additional attractors.

The structure of the neurons 12 employed in the present invention is standard. A summing amplifier combines the individual weighted signals from all synapses 14, and an activation function circuit is used to translate this signal. Not all neurons 12 necessarily use the activation function. For most learning algorithms to work, hidden neurons 12b (and possibly others) must have an activation function that is continuous and non-decreasing. The synapses 14 may be implemented in a number of ways, including, for example, the programmable analog resistive devices presently under development at the Jet Propulsion Laboratory in Pasadena, California, digitally controlled quantized digital to analog conductance converters, or cooled capacitors combined with multipliers.

Figure 2:
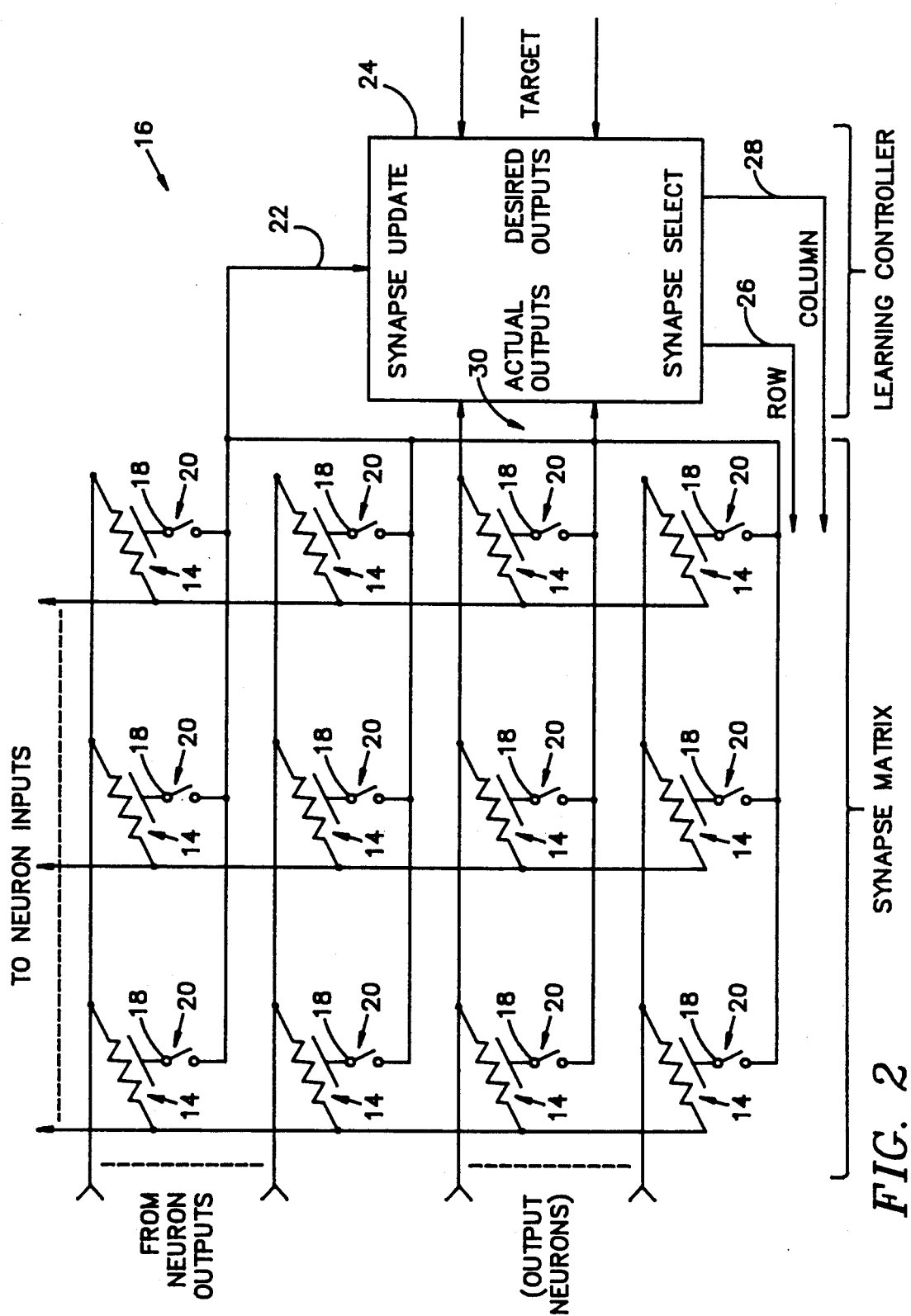
FIG. 2 is a simplified block diagram and drawing of the learning network portion of a neural network according to the present invention.

A block diagram of the learning network of the present invention is shown in FIG. 2 where it is generally indicated as 16. Each synapse 14 has a third terminal 18 for modifying its weight. This programming terminal 18 is enabled by closure of the switch 20 connecting the synapse 14 to the update line 22. The learning controller 24 consists of circuitry to update each synapse 14 in turn by enabling its programming switch 20 (via the row and column select lines 26, 28, respectively), changing the conductance value of the synapse slightly, and evaluating the effect of that slight change on the output 30. A learning rule as also implemented within the learning controller 24 is then applied to determine the final change in that synapse's conductance. It should be noted at this point that the manner and method of implementing the foregoing functional aspects of the learning controller 24 and the synapses 14 can be according to any of several well known to those skilled in the art without undue experimentation and, accordingly, in the interest of simplicity and the avoidance of redundancy, the particulars thereof are not addressed herein.

A number of possible learning rules can be used by the learning controller 24 to perform the final synapse update. A rule that has been used successfully in simulations by the inventor herein is:

$$\Delta w = \eta \sum_{i=0}^{M} \text{sign}_i |o_i^+ - o_i^-||o_i^+ - t_i|$$

where $\eta$ is the learning rate, $o^+$ and $o^-$ are the $i^{th}$ output neuron results before and after the temporary synapse modification, t is the $i^{th}$ target value, and "sign" is the direction in which the $i^{th}$ output changes with respect to the $i^{th}$ target. This particular learning algorithm is quite simple and can be readily implemented in VLSI hardware. Note that the system is based on a "trial and error" paradigm—weights are updated to the extent that a slight change in weight (the trial) causes a useful change (error reduction) in the output. Thus, errors and malfunctions in the data retrieval network 10 are taken into account in calculating weight update values. It should also be noted that although a single-channel learning circuit is described herein, it is possible to use correlation techniques to update several synapses 14 in parallel. This can be done, for example, by applying a small amount of noise to perform the initial synapse variation, and correlating the noise with the output variation.

Figure 3:
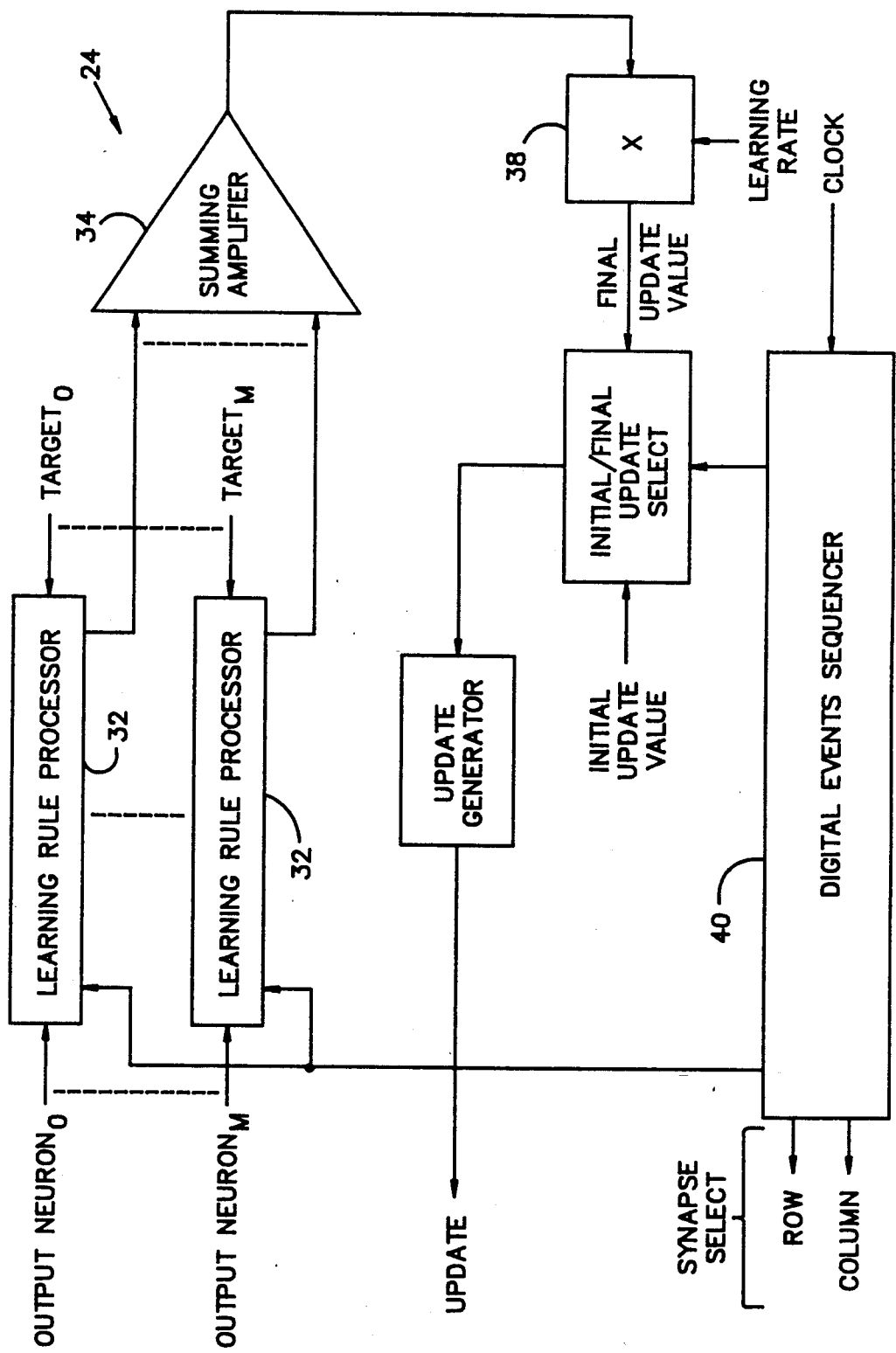
FIG. 3 is a simplified block diagram of the learning controller employed in a neural network according to the present invention.

A possible configuration for the learning controller 24 is shown in FIG. 3. Connected to receive the results of each output neuron 12c is a learning rule processor 32 which determines the component of error reduction or increase due to that neuron's variation (i.e. the calculation following the summation in the above equation, for example). Individual error components are summed in the summing amplifier 34 and the result is scaled by the learning rate at 36. The update generator 38 is used to generate the actual signals required to change the weight of the synapses; the actual circuitry depending, of course, on the specific synaptic device used. The overall procedure for performing learning is under the control of a digital events sequencer 40 which is repeatedly sequenced through its steps of operation as described herein by a CLOCK input as indicated. After new training data is available at the network and target inputs, the sequencer 40 iteratively selects a synapse 14 (via row and column enable signals on lines 26, 28), and controls the initial and final weight change operations.

Figure 4:
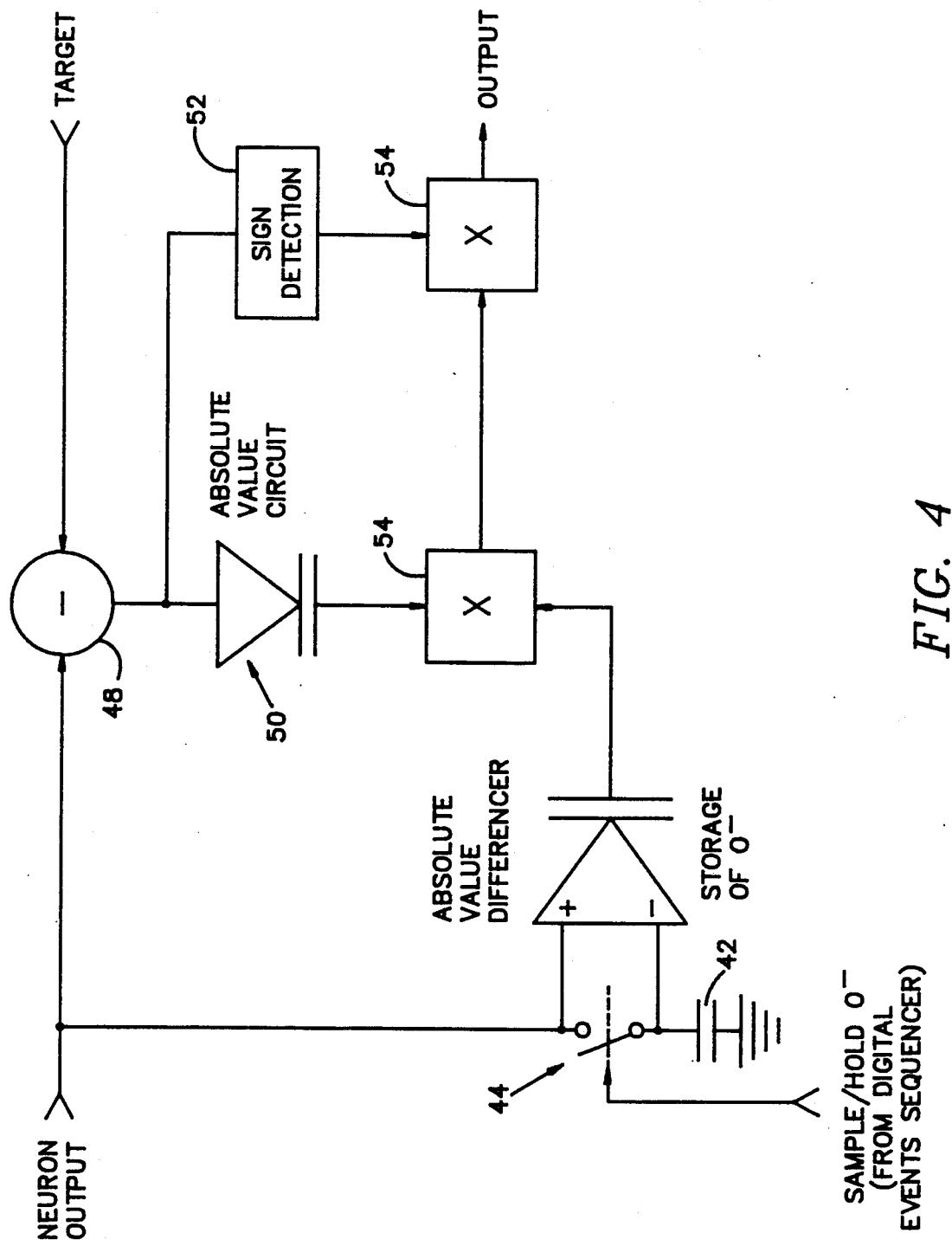
FIG. 4 is a circuit drawing of an analog circuit for implementing a learning rule processor as can be employed in the learning controller of FIG. 3 when employing a learning rule as provided by way of example in the specification of the present invention.

A block diagram of a learning rule processor 32 that implements the learning rule given in the equation above is shown in FIG. 4. The component blocks thereof can be implemented readily in custom analog CMOS VLSI chips. The absolute value of the change in neuron output is calculated using a sample-and-hold capacitor 42 and switch 44, and an absolute value differencing circuit 46. The absolute value of the difference between target and output is calculated by a subtraction circuit 48 and an absolute value circuit 50. The latter subtraction result is also integrated and thresholded at 52 to determine the direction of change of the neuron output (i.e. toward or away from the target). Multiplier circuits 54 are used to perform the actual multiplications.

In conclusion, neural networks that learn will play an important role in future systems that perform ill-defined functions such as pattern recognition and decision-making based on sketchy or noisy input data. Many applications will require real-time data retrieval, which can only be achieved with a fully-parallel hardware implementation of the neural network systems; yet wherein, the time required for learning often is not a critical factor. The learning system of this invention as described hereinbefore and in the drawing figures which accompany it may be used to implement a wide variety of applications that require either single-attractor or multiple-attractor neural network system; and, is eminently suitable for implementation in analog VLSI.

Wherefore, having thus described my invention, what is claimed is:

1. A neural network processor capable of fully-parallel analog implementation of both single-attractor and multiple-attractor configurations with maximum speed of operation comprising:
  a) a plurality of input neurons each having an input for receiving a voltage stimulus and an output for outputting a voltage output;
  b) a plurality of output neurons each having an input for receiving a voltage input and an output for outputting a voltage output;
  c) a synaptic array comprising a plurality of synapses connecting said output of respective ones of said input neurons to said input of respective ones of said output neurons, each of said synapses having a weighting factor associated therewith determining a conductance value therethrough and means for changing said weighting factor including a weighting factor input;
  d) a weighting factor update conductor disposed throughout said synaptic array;
  e) a plurality of individually addressable switches connected between said weighting factor input of respective ones of said synapses and said weighting factor update conductor;
  f) learning controller means connected to said individually addressable switches and said weighting factor update conductor for enabling selected ones of said switches to connect said weighting factor input of a corresponding one of said synapses to said weighting factor update conductor and for simultaneously applying a weighting factor update voltage value to said weighting factor update conductor; and,
  wherein said learning controller means includes logic for updating each said synapse in turn by enabling a corresponding one of said individually addressable switches, making an initial change in the conductance value of said corresponding synapse, evaluating corresponding changes at outputs of said output neurons, and implementing therefrom a learning rule to determine a final change in said conductance of said corresponding synapse.

2. The neural network processor of claim 1 wherein said learning rule determines said final change in the conductance value of said corresponding synapse as:

$$\Delta w = \eta \sum_{i=0}^{M} \text{sign}_i |o_i^+ - o_i^-||o_i^+ - t_i|$$

where $\Delta w$ is the final change in the conductance value of said corresponding synapse, $\eta$ is a previously-established learning rate, $o^+$ and $o^-$ are, respectively, values of the output of an $i^{th}$ one of said output neurons before and after said learning controller means makes said initial change, $t_i$ is a target value for the output of the $i^{th}$ one of said output neurons, and "sign" is a direction in which the output of the $i^{th}$ output neuron changes with respect to $t_i$.

3. The neural network processor of claim 1 wherein said learning controller means comprises:
  a) a plurality of learning rule processor means connected to said output of respective ones of said output neurons for determining an error reduction or increase due to a change in the output of each of said output neurons in response to voltage stimuli applied to said inputs of said input neurons and said initial change in the conductance value of said corresponding synapse, according to a learning rule implemented thereby;
  b) summing amplifier means for receiving said component of error from said plurality of learning rule processor means at an input thereof and for providing a summation thereof at an output;
  c) scaling means for receiving said summation from said summing amplifier means at an input thereof and for providing said summation scaled by a pre-established learning rate at an output thereof;
  d) update generator means for receiving a scaled summation from said scaling means at an input thereof and for generating a voltage signal required to change the conductance of a said synapse and applying said voltage signal to said weighting factor update conductor; and,
  e) digital events sequencer means having a CLOCK input thereto for causing said digital event sequencer means to repeatedly sequence through a plurality of learning steps.

4. The neural network processor of claim 3 wherein said learning rule determines said final change in the conductance value of said corresponding synapse as:

$$\Delta w = \eta \sum_{i=0}^{M} \text{sign}_i |o_i^+ - o_i^-||o_i^+ - t_i|$$

where $\Delta w$ is the final change in the conductance value of said corresponding synapse, $\eta$ is a previously-established learning rate, $o^+$ and $o^-$ are, respectively, values of the output of an $i^{th}$ one of said output neurons before and after said learning controller means makes said initial change, $t_i$ is a target value for the output of the $i^{th}$ one of said output neurons, and "sign" is a direction in which the output of the $i^{th}$ output neuron changes with respect to $t_i$.

5. A neural network processor capable of fully-parallel analog implementation of both single-attractor and multiple-attractor configurations with maximum speed of operation comprising:
   a) a data retrieval network portion comprising,
      a1) a plurality of input neurons each having an input for receiving a voltage stimulus and an output for outputting a voltage output,
      a2) a plurality of output neurons each having an input for receiving a voltage input and an output for outputting a voltage output, and
      a3) a synaptic array comprising a plurality of synapses connecting said output of respective ones of said input neurons to said input of respective ones of said output neurons, each of said synapses having a weighting factor associated therewith determining a conductance value therethrough and means for changing said weighting factor including a weighting factor input; and,
   b) a learning network portion comprising,
      b1) a weighting factor update conductor disposed throughout said synaptic array,
      b2) a plurality of individually addressable switches connected between said weighting factor input of respective ones of said synapses and said weighting factor update conductor, and
      b3) learning controller means connected to said individually addressable switches and said weighting factor update conductor for enabling selected ones of said individually addressable switches to connect said weighting factor input of a corresponding one of said synapses to said weighting factor update conductor and for simultaneously applying a weighting factor update voltage value to said weighting factor update conductor, wherein said learning controller means includes logic for updating each said synapse in turn by enabling a corresponding one of said individually addressable switches, making an initial change in the conductance value of said corresponding synapse, directly evaluating corresponding changes at outputs of said output neurons, and implementing therefrom a learning rule to determine a final change in said conductance of said corresponding synapse.

6. The neural network processor of claim 5 wherein said learning rule determines said final change in the conductance value of said corresponding synapse as:

$$\Delta w = \eta \sum_{i=0}^{M} \text{sign}_i \, |o_i^+ - o_i^-| |o_i^+ - t_i|$$

where $\Delta w$ is the final change in the conductance value of said corresponding synapse, $\eta$ is a previously-established learning rate, $o^+$ and $o^-$ are, respectively, values of the output of an $i^{th}$ one of said output neurons before and after said learning controller means makes said initial change, $t_i$ is a target value for the output of the $i^{th}$ one of said output neurons, and "sign" is a direction in which the output of the $i^{th}$ output neuron changes with respect to $t_i$.

7. The neural network processor of claim 5 wherein said learning controller means comprises:
   a) a plurality of learning rule processor means connected to said output of respective ones of said output neurons for determining an error reduction or increase due to a change in the output of each of said output neurons in response to voltage stimuli applied to said inputs of said input neurons and said initial change in the conductance value of said corresponding synapse, according to a learning rule implemented thereby;
   b) summing amplifier means for receiving said component of error from said plurality of learning rule processor means at an input thereof and for providing a summation thereof at an output;
   c) scaling means for receiving said summation from said summing amplifier means at an input thereof and for providing said summation scaled by a preestablished learning rate at an output thereof;
   d) update generator means for receiving a scaled summation from said scaling means at an input thereof and for generating a voltage signal required to change the conductance of a said synapse and applying said voltage signal to said weighting factor update conductor; and,
   e) digital events sequencer means having a CLOCK input thereto for causing said digital event sequencer means to repeatedly sequence through a plurality of learning steps.

8. The neural network processor of claim 7 wherein said learning rule determines said final change in the conductance value of said corresponding synapse as:

$$\Delta w = \eta \sum_{i=0}^{M} \text{sign}_i \, |o_i^+ - o_i^-| |o_i^+ - t_i|$$

where $\Delta w$ is the final change in the conductance value of said corresponding synapse, $\eta$ is a previously-established learning rate, $o^+$ and $o^-$ are, respectively, values of the output of an $i^{th}$ one of said output neurons before and after said learning controller means makes said initial change, $t_i$ is a target value for the output of the $i^{th}$ one of said output neurons, and "sign" is a direction in which the output of the $i^{th}$ output neuron changes with respect to $t_i$.

9. A neural network processor capable of fully-parallel analog implementation of both single-attractor and multiple-attractor configurations with maximum speed of operation comprising:
   a) a data retrieval network portion comprising,
      a1) a plurality of input neurons each having an input for receiving a voltage stimulus and an output for outputting a voltage output,
      a2) a plurality of output neurons each having an input for receiving a voltage input and an output for outputting a voltage output, and
      a3) a synaptic array comprising a plurality of synapses connecting said output of respective ones of said input neurons to said input of respective ones of said output neurons, each of said synapses having a weighting factor associated therewith determining a conductance valve therethrough and means for changing said weighting factor including a weighting factor input;
   b) a learning network portion comprising,
      b1) a weighting factor update conductor disposed throughout said synaptic array, b2) a plurality of individually addressable switches connected between said weighting factor input of respective ones of said synapses and said weighting factor update conductor, and b3) learning controller means connected to said individually addressable switches and said weighting factor update conductor for enabling selected ones of said individually addressable switches to connect said weighting factor input of a corresponding one of said synapses to said weighting factor update conductor and for simultaneously applying a weighting factor update voltage value to said weighting factor update conductor, said learning controller means comprising, a plurality of learning rule processor means connected to said output of respective ones of said output neurons for determining an error reduction or increase due to a change in the output of each of said output neurons in response to voltage stimuli applied to said inputs of said input neurons and said initial change in the conductance value of said corresponding synapse, according to a learning rule implemented thereby, summing amplifier means for receiving said component of error from said plurality of learning rule processor means at an input thereof and for providing a summation thereof at an output, scaling means for receiving said summation from said summing amplifier means at an input thereof and for providing said summation scaled by a pre-established learning rate at an output thereof, update generator means for receiving a scaled summation from said scaling means at an input thereof and for generating a voltage signal required to change the conductance of a said synapse and applying said voltage signal to said weighting factor update conductor, and, digital events sequencer means having a CLOCK input thereto for causing said digital event sequencer means to repeatedly sequence through a plurality of learning steps.

10. The neural network processor of claim 9 wherein said learning rule determines said final change in the conductance value of said corresponding synapse as:

$$\Delta w = \eta \sum_{i=0}^{M} \text{sign}_i \, |o_i^+ - o_i^-| \, |o_i^+ - t_i|$$

where $\Delta w$ is the final change in the conductance value of said corresponding synapse, $\eta$ is a previously-established learning rate, $o^+$ and $o^-$ are, respectively, values of the output of an $i^{th}$ one of said output neurons before and after said learning controller means makes said initial change, $t_i$ is a target value for the output of the $i^{th}$ one of said output neurons, and "sign" is a direction in which the output of the $i^{th}$ output neuron changes with respect to $t_i$.

* * * * *